(12) United States Patent
Moeller et al.

(10) Patent No.: US 8,885,625 B2
(45) Date of Patent: *Nov. 11, 2014

(54) NETWORKED MOBILE ROUTER

(75) Inventors: Douglas S Moeller, Santa Rosa, CA (US); Ronald W Pashby, San Francisco, CA (US)

(73) Assignee: Auto Net Mobile, Inc., San Francisco, CA (US)

( * ) Notice: Subject to any disclaimer, the term of this patent is extended or adjusted under 35 U.S.C. 154(b) by 326 days.

This patent is subject to a terminal disclaimer.

(21) Appl. No.: 13/415,811

(22) Filed: Mar. 8, 2012

(65) Prior Publication Data

US 2012/0203915 A1 Aug. 9, 2012

Related U.S. Application Data

(63) Continuation-in-part of application No. 12/514,049, filed as application No. PCT/US2007/011624 on May 15, 2007, now Pat. No. 8,189,552.

(60) Provisional application No. 60/800,749, filed on May 16, 2006, provisional application No. 60/800,679, filed on May 16, 2006, provisional application No. 60/800,750, filed on May 16, 2006.

(51) Int. Cl.
*H04W 4/00* (2009.01)
*H04W 76/02* (2009.01)
*H04W 8/26* (2009.01)
*H04W 40/20* (2009.01)
*H04W 84/00* (2009.01)
*H04W 92/24* (2009.01)

(52) U.S. Cl.
CPC ............. *H04W 76/02* (2013.01); *H04W 8/26* (2013.01); *H04W 40/20* (2013.01); *H04W 84/005* (2013.01); *H04W 92/24* (2013.01)
USPC ......... 370/338; 370/328; 370/236; 455/426.1

(58) Field of Classification Search
USPC ..................... 370/328, 338, 236; 455/426.1
See application file for complete search history.

(56) References Cited

U.S. PATENT DOCUMENTS

2003/0016636 A1* 1/2003 Tari et al. ................ 370/328
2005/0229257 A1* 10/2005 Kim et al. ................ 726/27

* cited by examiner

*Primary Examiner* — Sharad Rampuria
*Assistant Examiner* — Sayed T Zewari
(74) *Attorney, Agent, or Firm* — Donald J Lenkszus

(57) ABSTRACT

A method for operating a wireless mobile router comprises the steps of storing information comprising configuration information and main server information utilizable to identify a main network server; establishing initial communication via a wireless link to a network comprising a main server and a plurality of group servers; directing the initial communication to the main server; uploading the configuration information to the main server via said network; establishing a second communication to the main server; receiving group server identification information from said main server during the second communication; storing the group server identification information comprising information identifying one or more servers corresponding with a predetermined group assigned by the main server; and utilizing the group server identification information for subsequent communication via the network.

17 Claims, 7 Drawing Sheets

NETWORKED MOBILE ROUTER

CROSS-REFERENCE TO RELATED APPLICATIONS

The present application is a continuation-in-part of U.S. patent application Ser. No. 12/514,049 now U.S. Pat. No. 8,189,552 filed as PCT Application No. PCT/US07/11624 filed on May 15, 2007 and claiming priority to U.S. provisional application Ser. No. 60/800,749, filed May 16, 2006, U.S. provisional application Ser. No. 60/800,679, filed May 16, 2006 and claiming priority to U.S. provisional application Ser. No. 60/800,750, filed May 16, 2006.

FIELD OF THE INVENTION

The present invention relates to a networked vehicular wireless mobile router arrangement.

BACKGROUND

The use of mobile or wireless end-user computer-type devices has increased significantly. Such mobile devices must be able to connect to a wireless network. Wireless local area networks (LANs) are often deployed inside structures such as homes, offices, public and commercial buildings. A typical wireless LAN comprises one or more wireless access points, such as a wireless router or "hot spot", which communicates wirelessly with the mobile device, and allows the mobile device to connect to a wired network or other network that is also in communication with the access point. To stay connected to such a wireless LAN, the mobile device must usually stay within wireless communication range of the access points. This constrains the effective mobility of a wireless device.

The mobility constraining problem is particularly aggravated when the mobile device is disposed within a vehicle that is in motion. The mobility constraining problem has been addressed somewhat by use of cellular networks that allow mobile devices having cellular network interfaces to communicate wireless data with such cellular networks. However, most mobile computer devices do not have cellular network interfaces.

As the use of mobile devices has expanded, the mobility of such devices has expanded to the use wireless routers in vehicles. Such routers are referred to as "mobile routers" or "mobile nodes". Mobile routers typically permit a mobile device located in a vehicle that is in motion to maintain a connection to a wide area network and thereby greatly expand the mobility of the mobile device. Mobile routers are fully operable whether the vehicle having a mobile router installed therein is in motion or stationary. The mobile router may maintain connection to the Internet as it travels across cellular networks.

SUMMARY

An embodiment of a networked mobile router comprises an interface to a wireless communications link; a memory storing information comprising configuration information and main server information utilizable to identify a main network server; and a communications agent operable with the interface to establish communication via the wireless communications link to a network comprising a main server and a plurality of group servers. The communications agent is operable such that its initial communication to the network utilizes the main server information to establish a first communication with the main server. The mobile router further comprises a microprocessor operable with the communications agent to interact with the main server to upload the configuration information from the memory to the main server via the network. The communications agent is operable to receive group server identification information from the main server when communicating with the main server a second time. The microprocessor is operable to store the group server identification information in the memory. The group server information comprises information identifying one or more servers corresponding with a predetermined group assigned by the main server. The communications agent utilizes the group server identification information for subsequent communication via the network.

In the embodiment of a networked mobile router, the group server identification information is received by the communications agent from the main server the second time the mobile router establishes communication with the main server. The communications agent utilizes the group server identification information to access one group server of the plurality of group servers.

The group server identification information comprises identification information for a predetermined number of group servers selectively assigned from the plurality of group servers.

In the embodiment, the microprocessor is operable to select a group server from the predetermined number of group servers with which to communicate via the network. The microprocessor selects the group server from the predetermined number of group servers in accordance with a predetermined selection algorithm.

In another embodiment, a mobile router, comprises: an interface to a wireless communications link; a memory for storing information comprising configuration information and main server information utilizable to identify a main network server; and apparatus operable to establish communication via the wireless communications link to a network comprising a main server and a plurality of group servers. The apparatus is operable such that its initial communication to the network utilizes the main server information to establish a first communication with the main server. The apparatus interacts with the main server to upload the configuration information to the main server via the network.

The apparatus receives group server identification information from the main server when communicating with the main server a second time. The apparatus operates to store the group server identification information in the memory. The group server information comprises information identifying one or more servers corresponding with a predetermined group assigned by the main server. The apparatus utilizes the group server identification information for subsequent communication via the network.

The group server identification information is received from the main server the second time the mobile router establishes communication with the main server.

The apparatus utilizes the group server identification information to access one group server of the plurality of group servers. The group server identification information comprises identification information for a predetermined number of group servers selectively assigned from the plurality of group servers.

The apparatus selects a group server from the predetermined number of group servers to communicate with via the network. The apparatus selects the group server from the predetermined number of group servers in accordance with a predetermined selection algorithm.

A method for operating a wireless mobile router comprises the steps of storing information comprising configuration information and main server information utilizable to identify a main network server; establishing initial communication via a wireless link to a network comprising a main server and a plurality of group servers; directing the initial communication to the main server; uploading the configuration information to the main server via said network; establishing a second communication to the main server; receiving group server identification information from said main server during the second communication; storing the group server identification information comprising information identifying one or more servers corresponding with a predetermined group assigned by the main server; and utilizing the group server identification information for subsequent communication via the network.

In a further embodiment, a mobile router comprises: an interface to a wireless communications link; a memory to store information comprising configuration information and main server information utilizable to identify a main network server; and router apparatus. The router apparatus is operable to: establish initial communication via the wireless communications link to a network comprising a main server and a plurality of group servers; direct the initial communication to said main server to establish a first communication with the main server; upload the configuration information to the main server via the network; establish a second communication to the main server; receive group server identification information from the main server during the second communication; store the group server identification information, the group server information comprising information identifying one or more servers corresponding with a predetermined group assigned by the main server; and utilize the group server identification information for subsequent communication via the network.

The apparatus receives the group server identification the second time the mobile router establishes communication with the main server. The apparatus utilizes the group server identification information to access one group server of the plurality of group servers for communications. The group server identification information comprises identification information for a predetermined number of group servers selectively assigned from the plurality of group servers.

The apparatus selects a group server from the predetermined number of group servers to communicate with via the network. The apparatus selects the group server from the predetermined number of group servers in accordance with a predetermined selection algorithm.

In an embodiment, a method comprises the steps of providing a plurality of mobile routers; providing a main server for tracking and monitoring the plurality of mobile routers; initially configuring each mobile router of the plurality of mobile routers to communicate with the main server; providing a first linked communication between each mobile router and the main server; registering each mobile router with the main server and uploading configuration information from each mobile router to the main server; assigning each mobile router with a predetermined group; subsequent to the registering and assigning steps, providing a second linked communication between each mobile router and the main server; and operating the main server such that when the second linked communication occurs, the main server reassigns each mobile router to communicate with at least one group server assigned to communicate with the predetermined group.

The embodiment may further comprise providing each at least one group server with a corresponding paired group server. Each server and its corresponding paired group server are identically configured.

The embodiment may further comprise selecting one group server as a primary server to track and monitor the plurality of mobile routers; selecting the corresponding paired server as a secondary server; and replicating data in the primary group server into the secondary. The replicating data step may be performed in real time.

The embodiment may even further comprise determining if a failure occurs in the primary server, and automatically switching to the secondary server as primary server upon determination of occurrence of the failure.

Still further, the embodiment may include repairing the primary server having the failure; and utilizing manual switchover to place the repaired server back in service.

In various embodiments the method may comprise providing the one group server at a first geographic location; and providing the corresponding paired group server at a second geographic location.

In various embodiments, the one group server has one network peering point; and the corresponding paired group server has a second network peering point.

In one embodiment, the method comprises the steps of: providing a main server for tracking and monitoring a plurality of mobile routers; initially configuring each mobile router of the plurality of mobile routers to communicate with the main server; providing a first linked communication between each mobile router and the main server; registering each mobile router with the main server and uploading configuration information from each mobile router to the main server; assigning each mobile router with at least one predetermined group selected from a plurality of predetermined groups; subsequent to the registering and assigning steps, providing a second linked communication between each mobile router and the main server; and operating the main server such that when each second linked communication occurs, the main server reassigns each mobile router to communicate with at least one group server assigned to communicate with the predetermined group by providing each the mobile router with the address of the at least one group server.

The method may comprise the additional steps of providing a plurality of group servers; and operating the main server to reassign each mobile router with a predetermined number of group server addresses to communicate with a corresponding predetermined number of group servers selected from the plurality of group servers. Each group server address corresponds to one group server of the predetermined number of group servers.

The method may further comprise the step of operating each mobile router to communicate with one of the predetermined number of group servers corresponding to one of the predetermined number of addresses.

The method may also comprise the step of storing in each mobile router the corresponding group server addresses. Each mobile router uses its stored group server addresses to access a corresponding group server that is available for communication.

In the various embodiments the method includes the step of operating the main server to assign each of the group servers to mobile routers of more than one predetermined group of the plurality of predetermined groups.

In the various embodiments the method may also include locating the group servers of the plurality of group servers in a plurality of geographic locations. In addition, the embodiment may include providing at least some of the group servers of the plurality of group servers with different network peering points.

In one embodiment a networked mobile router system comprises a plurality of mobile routers, and a main server operable to track and monitor the plurality of mobile routers. Each mobile router is initially configured to communicate with the main server and is operable to establish first communication with the main server to register with the main server to upload configuration information from each the mobile router to the main server. The main server is operable in response to each mobile router registering with the main server to assign each mobile router with a predetermined group. Each mobile router is operable to establish a second communication with the main server. The embodiment further comprises a plurality of group servers. The main server is operable in response to each mobile router second communication to reassign each mobile router to communicate with at least one group server of the plurality of group servers assigned to communicate with the predetermined group.

The embodiment of the networked mobile router system may comprise each group server comprising a corresponding paired group server. Both each group server and its corresponding paired group server are identically configured.

In an embodiment the at least one group server operates as a primary server to track and monitor the plurality of mobile routers; the corresponding paired server selected as a backup secondary server; and the primary group server and the secondary server operate such that data in the primary group server is replicated into the secondary server.

In an embodiment, the primary group server and the secondary server operate to determine if a failure occurs in the primary group server; and the primary group server and the secondary server operate to automatically switch to the secondary server as primary group server upon occurrence of a failure. After the original primary group server is repaired, it is manually switched back in service.

The at least one group server may be located at a first geographic location. The corresponding paired group server is located at a second geographic location.

The at least one group server has a one network peering point and the corresponding paired group server has a second network peering point.

Still further, in an embodiment the plurality of group servers are each located at a different selected geographic location selected from a plurality of geographic locations.

The plurality of group servers may each be selected as having a predetermined network peering point selected from a plurality of peering points.

In one embodiment, a networked mobile router system comprises: a plurality of mobile routers, a main server, and a plurality of group servers. Each mobile router is initially configured to communicate with the main server. A first linked communication between each mobile router and the main server is provided. Each mobile router is operable to initially register with the main server and operable to upload configuration information from each mobile router to the main server. The main server is operable to assign each mobile router with at least one predetermined group selected from a plurality of predetermined groups. The main server is operable, subsequent to registering and assigning the mobile router, to reassign each the mobile router to communicate with at least one group server assigned to communicate with the predetermined group by providing each mobile router with the address of the at least one group server.

In the embodiment, the main server is operable to reassign each mobile router with a predetermined number of group server addresses; and each mobile router is operable to communicate with a corresponding predetermined number of group servers selected from the plurality of group servers. Each group server address corresponds to one of the predetermined number of group servers.

In one embodiment, each mobile router is operated to communicate with one of the predetermined number of group servers corresponding to one of the predetermined number of addresses.

In one embodiment each mobile router comprises a memory and the corresponding group server addresses are stored therein. Each mobile router uses the stored group server addresses to access one of the corresponding group servers that is available for communication.

BRIEF DESCRIPTION OF THE DRAWING

The invention will be better understood by reading the following detailed description in conjunction with the drawing figures in which like designators refer to like elements, and in which.

DETAILED DESCRIPTION

Figure 1:
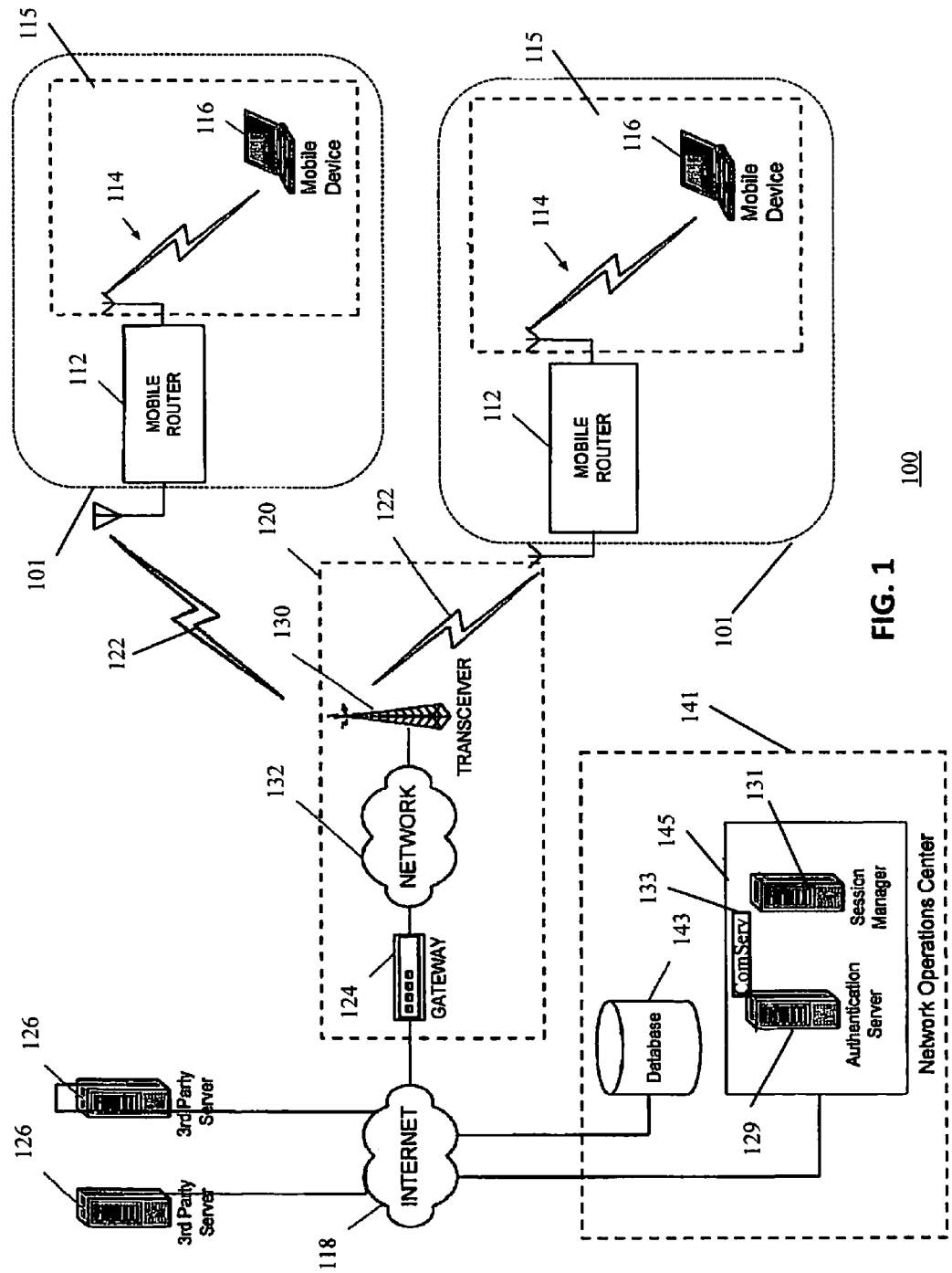
FIG. 1 is a block diagram of a first mobile router network arrangement.

FIG. 1 is a diagram of a mobile router network 100. Mobile router network 100 comprises a plurality of vehicles 101, each having therein a mobile router 112. Each vehicle 101 includes a wireless local area network 115. Each wireless local area network 115 may be in communication with one or more corresponding mobile devices 116 via a wireless communication link 114. Each wireless local area network 115 includes mobile router 112 and may or may not include one or more mobile devices 116. Each wireless local area network 115 may be, for example, a network compliant with industry standard IEEE 802.11 network, i.e., a Wi-Fi network, or a network compliant with industry standard IEEE 802.16, i.e., a WiMAX network, or a Bluetooth network, or any other suitable wireless network.

Each mobile device 116 may be any processor based device having a wireless transceiver capable of receiving and transmitting data via the wireless communication link 114. For example, one mobile device 116 may be a laptop (or notebook) computer equipped with a wireless network interface card, a wireless-enabled PDA, a pocket or palmtop computer, a Wi-Fi phone (e.g., a Skype phone or VoIP phone), a Wi-Fi appliance, a Sony PlayStation PSP or some other portable, network-enabled gaming station, a video screen, a digital camera, an audio player, a navigation device, a security camera, an alarm device, a wireless payment or POS device, or an automotive electronic device.

Mobile router 112 may act as a gateway between wireless network 115 and a backhaul network 20. In one embodiment, backhaul network 120 is a cellular wireless network. Backhaul network 120 in turn may be connected to the Internet 118 or any other network, such as an intranet or another WAN, via a gateway 24.

Mobile router 112 communicates with the backhaul network 120 via a backhaul wireless communication link 122. Backhaul wireless communication link 122 may be provided by a wireless network that is part of the backhaul network 120, such as a cellular wireless network. The cellular wireless network may be of any type.

Examples of such types of cellular network, include but are not limited to the following types: a Global System for Mobile Communications/General Packet Radio Service (GSM/GPRS) link; a UMTS (Universal Mobile Telecommunications System) link; a Code Division Multiple Access (CDMA) link; an Evolution-Data Optimized (EV-DO) link; an Enhanced Data Rates for GSM Evolution (EDGE) link; a 3GSM link; a Digital Enhanced Cordless Telecommunications (DECT) link; a Digital AMPS (IS-136/TDMA) link; an Integrated Digital Enhanced Link (iDEN) link; a WiMAX link; or any other suitable wireless link.

Each mobile router 112 and its corresponding mobile device 116 are co-located in a vehicle 101 so that mobile router 112 is capable of being mobile and operable to establish connectivity whether mobile or stationary such that each end-user of a mobile device 116 can enjoy wireless connectivity to Internet 118 via mobile router 112 as the vehicle travels through cells or nodes associated with wireless network 122. Vehicle 101 may be any type of vehicle that travels over and/or under land, over and/or under water, or in the air or space. The typical most common type of vehicle 101 that is likely to include a mobile router is a car, truck, or bus.

Each mobile router 112 may be mounted in a corresponding vehicle 101 in a secure and generally tamper-resistant location. For example, the mobile router 112 may be mounted in the trunk of an automobile, and the end-user of the mobile device 116 may be a passenger or driver of the automobile. That way, the end-user could enjoy wireless connectivity as the automobile moves between cells of the wireless network 122.

Although only one mobile device 116 is shown in communication with each mobile router 112 shown in FIG. 1, numerous mobile devices 116 may be in communication with a corresponding mobile router 112 via the corresponding local area network 115.

Cellular network cell site transceiver 130 may be used to provide a cellular link to mobile router 112 and both receive and transmit wireless signals to a mobile router 112 via one of the wireless cellular communication links 122. A cellular communication network 132 of cellular backhaul network 120 may communicate via the worldwide web or Internet 118 or another network via one or more gateways 124. Each communication network 132 may include conventional communication network elements to provide wireless cellular network service for each mobile router 112.

Figure 2:
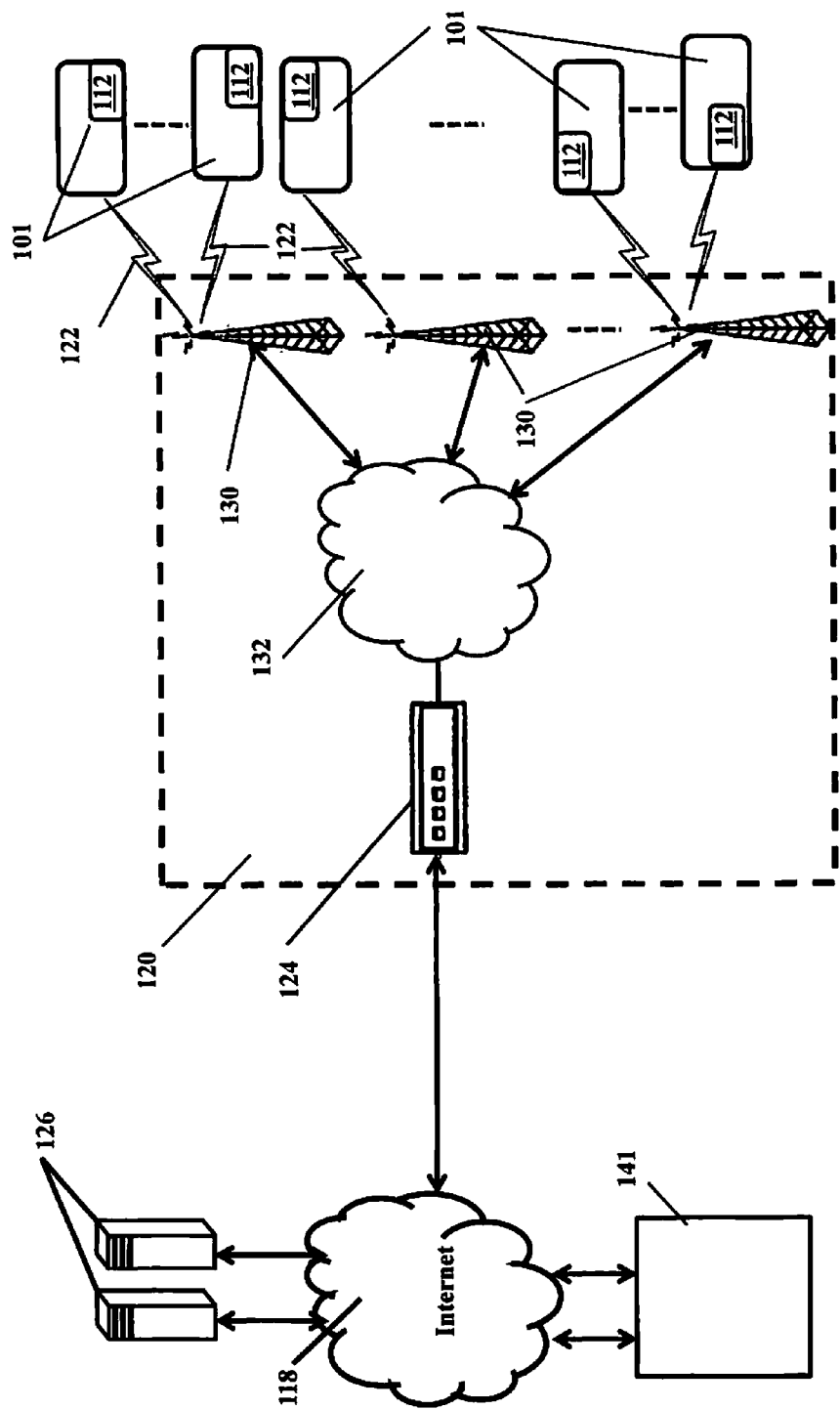
FIG. 2 is a block diagram of an expanded mobile router network arrangement.

Turning now to FIG. 2, mobile router network 100 is shown in a more expanded networked arrangement in which cellular backhaul network 120 is shown as having a plurality of cell site transceivers 130, each of which can communicate with one or more vehicles 101 having a mobile router 112 therein. FIG. 2 shows one gateway 124 to Internet 118, but it will be appreciated that there may be a plurality of such gateways 124, each of which may have access to the Internet 118 or to another network.

Figure 3:
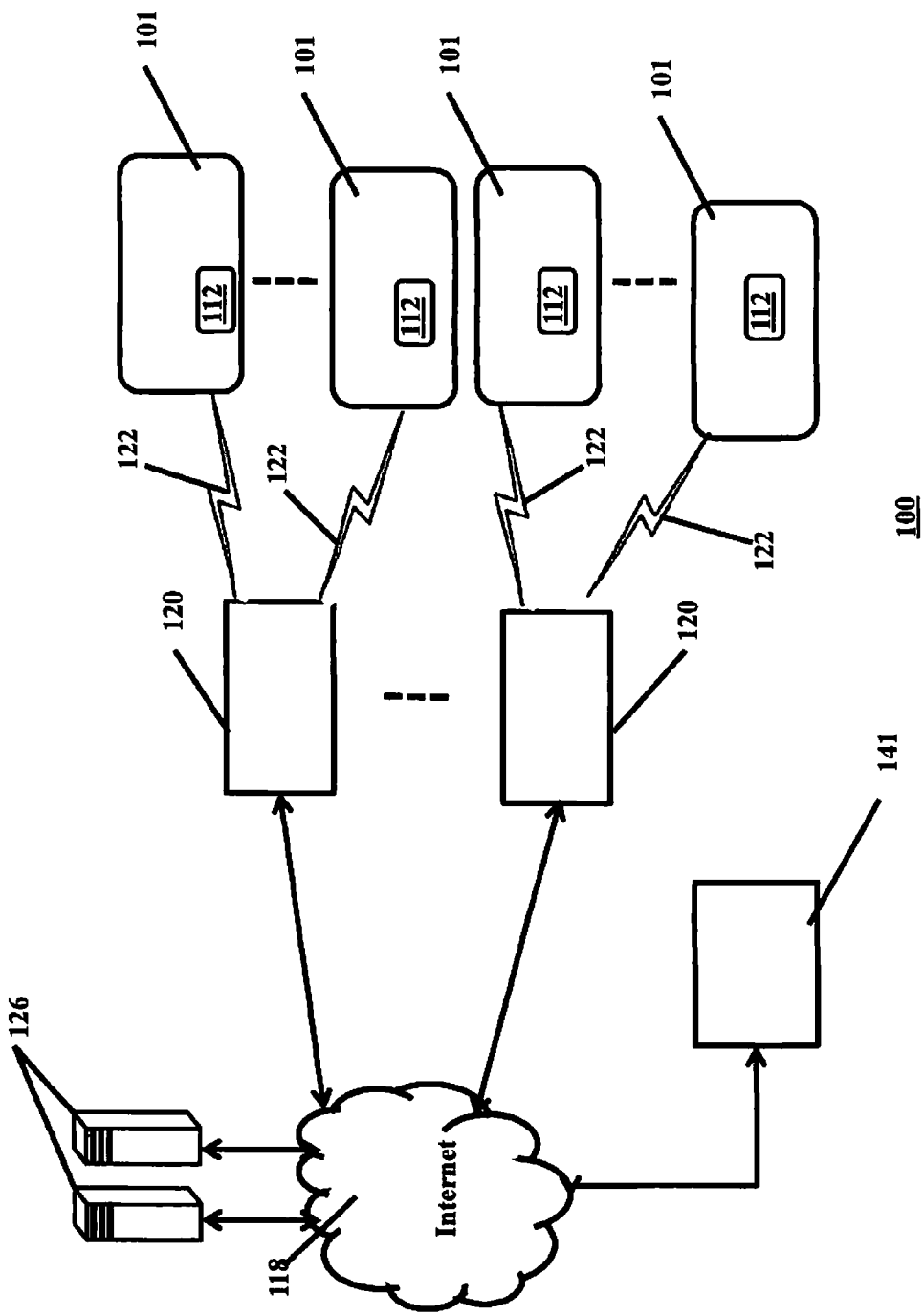
FIG. 3 is a block diagram of a further expanded mobile router network arrangement.

Turning now to FIG. 3, mobile router network 100 is illustrated in further expanded form to show that in which there may be a plurality of cellular backhaul networks 120 each comprising a number of cell site transceivers, each located in different areas serviced by the backhaul networks 120, such that each mobile router 112 may stay in communication with a backhaul network 120 as each mobile router 112 moves between cells or nodes of the backhaul networks 120. It will be appreciated by those skilled in the art, that there is virtually no limit to the size of mobile router network 100.

Each of FIGS. 1 through 3 shows that mobile router network 110 comprises at least one network operations center 141. Network operations center 141 comprises a database 143 and a network management system 145. Network management system 145 is a combination of hardware and software used to monitor and administer or otherwise manage mobile router network 100. Each mobile router 112 is managed as an individual network element.

Network management system 145, comprises an authentication server 129, a session manager 131, and a communication server 133. Communication server 133 is a combination of hardware and software used to manage communications between mobile routers 120, and network management system 145.

Figure 4:
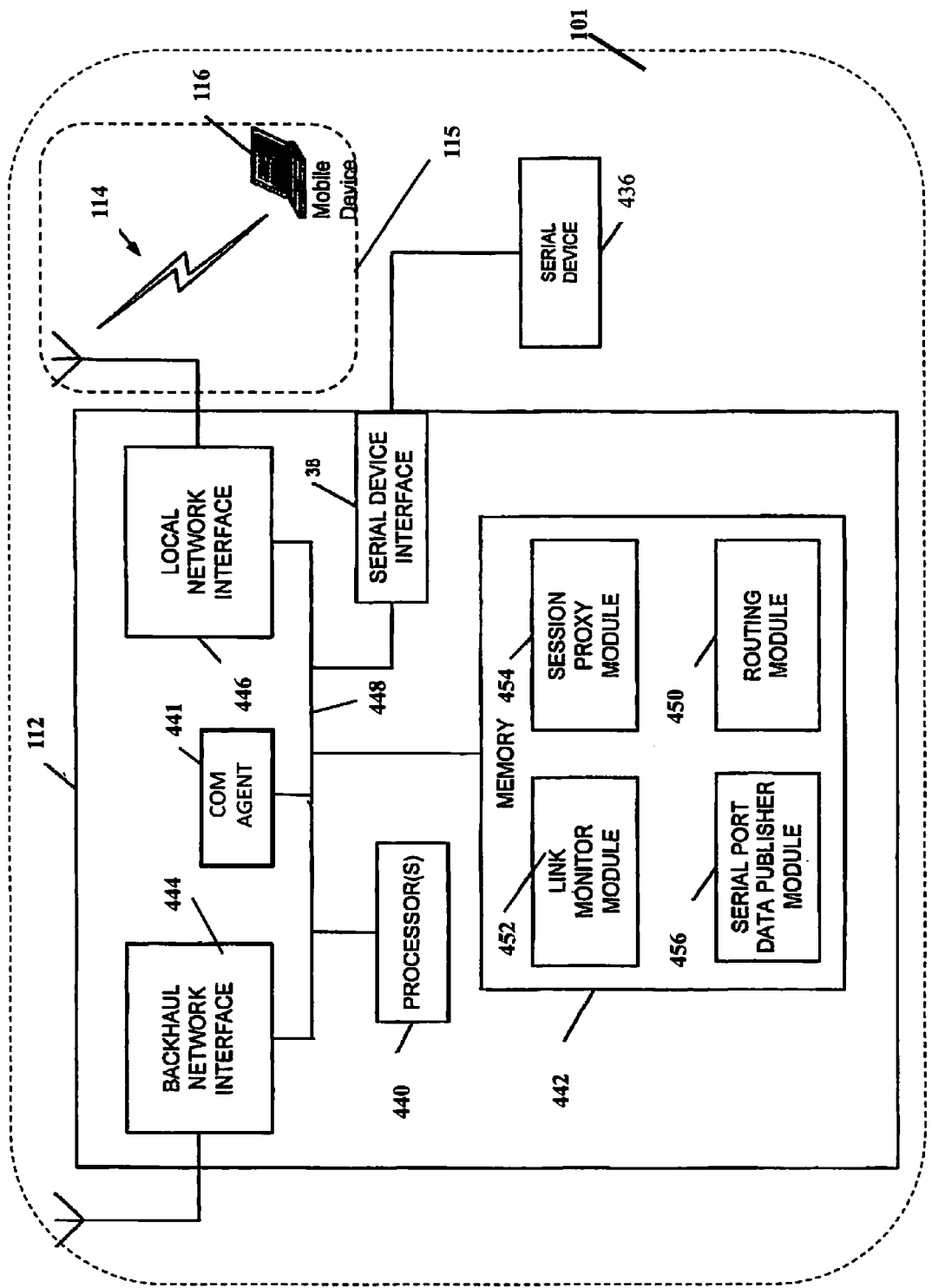
FIG. 4 is a block diagram of a mobile router.

FIG. 4 is a simplified block diagram of a mobile router 112 situated in a vehicle 101. Mobile router 112 comprises processor 440, one or more memory units 442, a backhaul network interface or wide area network interface or cellular network interface 444, and a local network interface 446. A system bus 448 interconnects processor 440, memory units 442, backhaul network interface 444 and local network interface 446.

Backhaul or cellular network interface 444 interfaces with and provides a wireless communication link with backhaul or cellular network 120 via cell site transceiver 130. Backhaul or cellular network interface 444 may interface with one or more types of wireless cellular communication links 122. For example, the backhaul cellular network interface 444 may interface to any one or more of: a Global System for Mobile Communications/General Packet Radio Service (GSM/GPRS) link; a UMTS (Universal Mobile Telecommunications System) link; a Code Division Multiple Access (CDMA) link; an Evolution-Data Optimized (EV-DO) link; an Enhanced Data Rates for GSM Evolution (EDGE) link; a 3GSM link; a Digital Enhanced Cordless Telecommunications (DECT) link; a Digital AMPS (IS-136/TDMA) link; an Integrated Digital Enhanced Link (iDEN) link; a WiMAX link; or any other suitable wireless link.

Local network interface 446 interfaces and provides a wireless communication link 114 with wireless local area network 115. Similarly, local network interface 446 may interface to one or more types of wireless network links 114 such as a Wi-Fi, WiMAX, or Bluetooth link.

Processor 440 may execute various programs or instruction code stored in memory 442. Memory 442 may comprise one or more types of computer-readable media. As such, memory 442 may comprise one or more memory chips, optical memory devices, magnetic memory devices, or other memory devices.

Various programs or program modules are executable by processor 440. The program modules include a routing module 450, a link monitor module 452, a session proxy module 454, and a serial port data publisher module 456. The program modules 450, 452, 454, 456 may be stored in portions of memory 442 or in one or move separate memories.

Routing module 450 is executed by processor 440 to route data packets between wireless network 415 and backhaul or cellular network 420. Link monitor program 452 monitors cellular communication links 122 (layer 2) and also Internet communication links (layer 3) via backhaul or cellular network 120 by sending test or probing data packets and monitoring for responses thereto. By monitoring the sending and receiving of test packets and responses, processor 440 executing link monitor program 452 detects if either (or both) of cellular communication link or Internet 118 link fails.

When processor 440, executing link monitor module 52, detects a drop-off, the dropped link is automatically reestablished to minimize the interruption in service to the end user.

In many prior art mobile routers, when communications links are lost, the end-user's applications and network sessions are terminated. The end-user has to restart the applications and/or session when the communications links and network connection are reestablished.

When processor 440 detects a failure in one or both of the communications link 122 or Internet 118 link, processor 440 initiates remedial action by attempting to reestablish the link or links. Processor 440 may reestablish the link before any applications on the corresponding mobile device 116 have to be restarted. That way, the user does not have to restart the applications or sessions. The user just typically notices that the applications/sessions slowed for a brief period of time while the connection was being reestablished.

Link monitor module 452 as executed on processor 440 provides adaptive programming. If backhaul or cellular network interface 44 receives data packets over backhaul wireless communication link 122, processor 440 sends fewer probing test data packets. Conversely, if backhaul or cellular network interface 444 does not receive data packets, processor 440 sends more probing test data packets. By monitoring data packets received via backhaul or cellular network interface 444, processor 440 determines that the interface is functioning. Accordingly, processor 440 sends data test packets less frequently.

Processor 440, executing link monitor module 452, monitors backhaul network interface 444 to determine that data packets are received. If processor 440 determines that backhaul wireless communication link 122 is working, then processor 440 sends fewer active probes on the backhaul or cellular network 120.

Processor 440, by executing session proxy module 454 acts as a session proxy for all TCP sessions going through mobile router 112. When a mobile device 116 seeks to establish a TCP session with a destination such as a third party server 126 coupled to Internet 118, 440 terminates the TCP session coming from mobile device 116 and, instead, establishes a TCP session via backhaul network interface 444 with the destination. Mobile router 112 also maintains a separate TCP session with mobile device 116 via local wireless communication link 114.

All end-user traffic between mobile device 116 and the destination is transparently routed through mobile router 112 during the two separate sessions. If one session such as the backhaul wireless communication link 122 goes down that does not negatively affect the session between the mobile router 112 and mobile device 116. As a result, processor 440 executing session proxy program module 454 maintains a TCP session to mobile device 116. If applications running on mobile device 116 are dependent upon a TCP session, the applications may continue to run because there is a TCP session with the mobile router 112, even though the TCP session over the backhaul or cellular wireless communication link 122 is lost. When communications via backhaul or cellular communication link 122 are reestablished, mobile device 116 is able to keep running its applications and session without having to restart the applications.

When communication over backhaul network or cellular communication link 122 is interrupted, processor 440, executing session proxy program module 454, prevents the TCP session for wireless communication link 114 to mobile device 116 from starting its back-off timers. Under TCP protocol, mobile device 116 would normally assume that it cannot forward packets because of network congestion and it would accordingly start to slow down the session. In contrast, processor 440 executing session proxy module 454 maintains a TCP session between mobile router 112 and mobile device 116. Mobile 116 device does not assume that network congestion is a problem and the TCP session between mobile router 112 and mobile device 116 does not slow down.

Execution of session proxy module 454 by processor 440 may be disabled by mobile device via a control panel for mobile router 112 displayed on mobile device 116. A user can disable execution of session proxy program module 454 when the user wants to maintain a TCP session with the destination.

Processor 440 when executing serial port data publisher module 456 makes data received from a serial device 436 connected to a serial port 438 available via mobile router 112 as a TCP stream or as some other type of data stream, such as HS-TCP or SCPS data stream. A remote database 125, as shown in FIG. 1 may be populated with the data from device 436 via backhaul or cellular network 120 and Internet 118 so that data from serial device 436 can be remotely accessed via the Internet 118.

Serial device 436 may communicate with mobile router 112 using any suitable serial data protocol, including the USB (Universal Serial Bus) standard, the RS-232 standard, the RS-485 standard, or the IEEE 1394 (FireWire) standard, for example.

Serial device 436 may be any suitable type of serial device, such as, for example, a GPS receiver. Other types of serial data devices 436 may be used. Serial device 436 may be a vehicle telematics device that captures data regarding the performance and operation of the vehicle (e.g., diagnostic data) in which the device is installed. Serial device 436 may be a point-of-sale (POS) device that captures sale or payment information.

Serial data device 436 may also be a remote control for an in-car entertainment system that enables downloading music, video, games, etc., to third party systems or a device for interfacing to communication systems.

Rather than transmitting the data to a central server, e.g., database 125 shown in FIG. 1, a remote user could access mobile router 112 to access the data from serial device 436 directly. In one embodiment, an authenticated remote user could access an authentication server 123 as shown in FIG. 1 to determine the address of a specific one mobile router 112. The remote user could then use that address to communicate with mobile router 112 directly. Similarly, a local end-user of the mobile router 112 could access the data from the serial device via the local wireless network 114.

Processor 440 can output data and command signals via serial interface 438 to serial device 436. Utilizing serial interface 438, processor 440 may activate and control various components and/or systems of a vehicle 101. Serial device 436 may be able to shut of the vehicle engine, unlock the doors, activate alarm functions, etc. Serial device 436 may also, according to various embodiments, perform payment functions, download data, receive advertising, entertainment, gaming, and/or information, as well as perform network management and control.

Each mobile router 112 includes a communication agent 441. Communication agent 441, in the embodiment shown, is a program executed by processor 440, but in other embodiments, communication agent 441 may be a separate processor and program. Communication agent 441 cooperatively operates with communication server 133 shown in FIG. 1.

Processor 440 of each mobile router 112 has the ability to run applications that can perform functions and collect data independently of whether or not mobile router 112 is linked to network management system 120.

Each mobile router has associated with it a specific identifier that is maintained in database 145. The specific identifier can be any unique identifier such as a router serial number or a vehicle identification number. Network operations center 141, utilizing communication server 133, is capable of selectively communicating with each mobile router 112.

Advantageously, the selective communication between each mobile router 112 and network operation center 141 permits the downloading of application programs 565 to each of mobile routers 112 for storage in memory 442 on a selective basis, the communication of data obtained from each router 112 as a consequence of execution of a downloaded application program, and/or the communication of statistical information obtained in or by a mobile router as a result of execution of an application program.

In addition, network operation center 141 is operable to facilitate the downloading of application programs ordered by each mobile router 112 directly or indirectly from third party servers 126.

Network operations center 145 also sends predetermined commands to specific predetermined specific mobile routers 112 for immediate execution or for execution at a predetermined specified interval.

Figure 5:
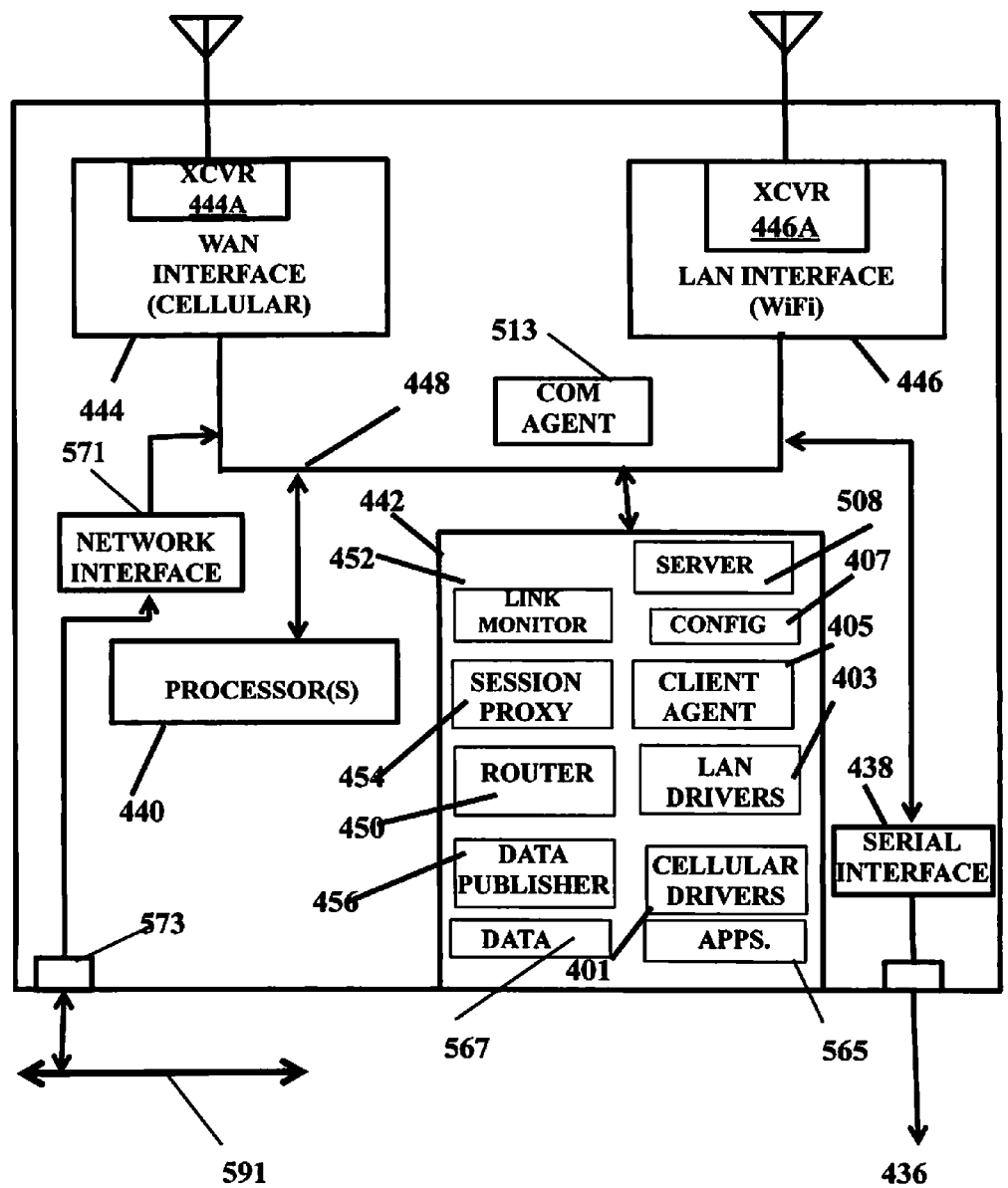
FIG. 5 is a more detailed block diagram of the mobile router of FIG. 4.

As shown in FIG. 5 each mobile router 112 stores application programs in memory 565. Each mobile router 112 is operable to collect data utilizing application programs 565 as well as from interfaces to the vehicle in which mobile router 12 is installed and/or from peripherals 430 coupled to mobile router 112 via serial data interface 438 and/or from mobile device 16. The collected data is marked with a timestamp and stored in memory 442 of mobile router 112. Depending on the nature of the data, mobile router 112 may process the data and prepare the resulting processed data for upload or mobile router 112 may prepare the data immediately for upload to network management system 120. In accordance with one embodiment, the data may be provided by a telematics device or devices.

In certain embodiments, each vehicle 101 includes a vehicle network bus 591 that typically utilizes a standardized protocol over which data or commands may be communicated with various sensors, nodes, processors and other vehicular apparatus coupled to the vehicle network bus.

Vehicle network bus 591 is a specialized internal communications network that interconnects components inside a vehicle (e.g. automobile, bus, train, industrial or agricultural vehicle, ship, or aircraft). Special requirements for vehicle control such as assurance of message delivery, assured non-conflicting messages, assured time of delivery as well as low cost, EMF noise resilience, redundant routing and other characteristics are met with the use of various standardized networking protocols.

Standardized vehicle network bus protocols include Controller Area Network (CAN), Local Interconnect Network (LIN) and others.

Vehicle network bus 591 provides access to the various vehicle electronic control modules in the vehicle. Some of the typical electronic modules on today's vehicles are the Engine Control Unit (ECU), the Transmission Control Unit (TCU), the Anti-lock Braking System (ABS) and body control modules (BCM).

A vehicle electronic control module typically gets its input from sensors (speed, temperature, pressure, etc.) that it uses in its computation. Various actuators are used to enforce the actions determined by the module (turn the cooling fan on, change gear, etc.). The electronic control modules need to exchange data among themselves during the normal operation of the vehicle. For example, the engine needs to tell the transmission what the engine speed is, and the transmission needs to tell other modules when a gear shift occurs. This need to exchange data quickly and reliably led to the development of vehicle network bus 591. Vehicle network bus 591 is the medium of data exchange.

Vehicle network bus 591 is utilized to create a central network in the vehicle 101. Each electronic control modules is 'plugged' into the network and can communicate with any other electronic control module installed on the network via vehicle network bus 591. Each electronic control module controls specific components related to its function and communicates with the other modules as necessary, using a standard protocol, over the vehicle network bus 591.

In addition, vehicle network bus 591 may utilize any one of a number of physical transmission media, including, but not limited to: single wire, twisted pair, and fiber optic.

Each mobile router 112 includes a vehicle network bus interface 571 and a connector 573 that connects to the vehicle network bus 591 of vehicle 101.

In one embodiment, a vehicle 101 comprises a vehicle network bus 591 and a mobile router 112. Mobile router 112 comprises a local area network interface 446 comprising a first wireless transceiver 446A of a first predetermined type to provide a link 114 to first a local area network 114 and a wide area network interface 444 comprising a second wireless transceiver 444A of a second predetermined type to provide a link 122 to a wide area network 122. The embodiment further comprises processor 440 to control operation of the local area network interface 446 and the wide area network interface 444. One of the wide area network interface 444 and the local area network interface 446 is selectively operable to establish a wireless communication link with network management system 141 comprising a communication server 133. Each mobile router 112 further comprises a communication agent 513, and an application 565 executable by the 440 to selectively acquire predetermined data from the vehicle network bus 591. Communication agent 513 is operable to upload the predetermined data obtained from vehicle network bus 591 to network management system 141 of FIGS. 1, 2, 3.

Processor 440 is operable to acquire the predetermined data during time periods that wide area network interface 444 is not communicating with network management system 141. Communication agent 513 is operable to upload the predetermined data to network management system 141 upon occurrence of a predetermined event.

The predetermined event may comprise a predetermined time period that may be the time wide area network interface 444 is in communication with network management system 141 and/or the predetermined event is determined by the predetermined data, such as, for example, data that indicates deployment of an air bag.

Mobile router 112 stores the predetermined data in memory 567.

Processor 440 provides a time stamp for the predetermined data at the time the predetermined acquired data is acquired. The time stamp is stored in memory 567 in association with the corresponding predetermined data.

Processor 440 is operable to assign a priority for the predetermined data; and is operable to execute a predetermined action to take with the predetermined data.

Processor 440 is operable to initiate immediate upload of the predetermined data to network management system 141 of the predetermined data having a predetermined one assigned priority. By way of non-limiting example, data indicating deployment of air bags would be assigned a priority for immediate upload.

Processor 440 is operable to control upload of predetermined data having a first predetermined one assigned priority at a first data rate. Processor 440 is operable to control upload of second predetermined data having a predetermined second assigned priority at a second predetermined data rate, the second predetermined data rate being slower than the first predetermined data rate.

Communication agent 513 is operable to determine if uploading of the predetermined data is interrupted. Communication agent 513 is operable in cooperation with the communication server 133 to restore uploading of the predetermined data to network management system 141 from the point of interruption when a communication link between the network management system 141 communication server 133 and the communication agent 513 is restored.

Processor 440 is operable to process the predetermined data prior to the data being uploaded; and processor 440 is operable to store the processed predetermined data as the predetermined data in memory 567.

A time stamp is generated for the predetermined data when it is acquired. The time stamp is stored in memory 567 in association with the corresponding processed predetermined data.

Communication agent 513 may be further operable to determine when uploading occurs in cooperation with the application program or programs 565.

The predetermined data may comprise statistical data and/or diagnostic data. The diagnostic data is obtained via the vehicle network bus interface 571. Processor 440 is operable to process the diagnostic data to generate message data. Communication agent 513 is operable to upload the message data to network management system 141 via one of the local area network interface 446 and the wide area network interface 444.

In various embodiments, the application or applications 565 is or are downloaded to the vehicle via one of the wide area network interface 444 and the local area network interface 446.

It will be appreciated by those skilled in the art that the various functions of each of the plurality of mobile routers 112 may be integrated directly into a vehicle 101. In such an application of the principles of the invention, a vehicle 101 may comprise a vehicle network bus 591; a local area network interface 546 comprising a first wireless transceiver 546A of a first predetermined type to provide a link 114 to first a local area network 115; a wide area network interface 444 comprising a second wireless transceiver 444A of a second predetermined type to provide a link 122 to a wide area network 120; processor 140 to control operation of the local area network interface 446 and the wide area network interface 444. At least one of the wide area network interface 446 and the local area network interface 444 is selectively operable to establish a wireless communication link with a network management system 141 comprising a communication server 133. Vehicle 101 further comprises a communication agent 441 and one or more applications 565 executable by processor 140 to selectively acquire predetermined data from the vehicle network bus 591. Communication agent 513 is operable to upload the predetermined data to network management system 141.

Data for uploading can be prioritized and rate limited by processor 140. By way of non-limiting example, if the data has a high priority, such as an indication of airbag deployment then the data is immediately prioritized over anything else and is uploaded. If the data has a low priority it can be sent at a low bit rate so as not to interfere with the experience of the user of mobile device 16 or anything the user might be doing. For example, low priority data may be "trickled up" or uploaded at 10 Kbps.

If the uploading of data from a mobile router 112 or vehicle 101 is interrupted for any reason the session, such as, for example, by loss of communications via a wireless wide area network communication link 122, mobile router 112 or processor 440 will restore the uploading of data where the uploading had left off, when a communication link is again established to communication server 133.

In various embodiments, the number of mobile routers 112 may be very large, and may number millions of mobile routers 112 or other mobile devices. To efficiently provide an arrangement for tracking/monitoring the number of routers, a distributed network arrangement and method is provided for providing communication to the routers. More specifically, to support the ability of the system to scale up back-end systems that support mobile devices in vehicles that number from a few thousand to millions, we developed a method and architecture that allows for easy addition of capacity as the networked number of mobile routers increases.

Every mobile router 112 is configured to communicate with a communication server for uploading of data and for downloading content.

Figure 6:
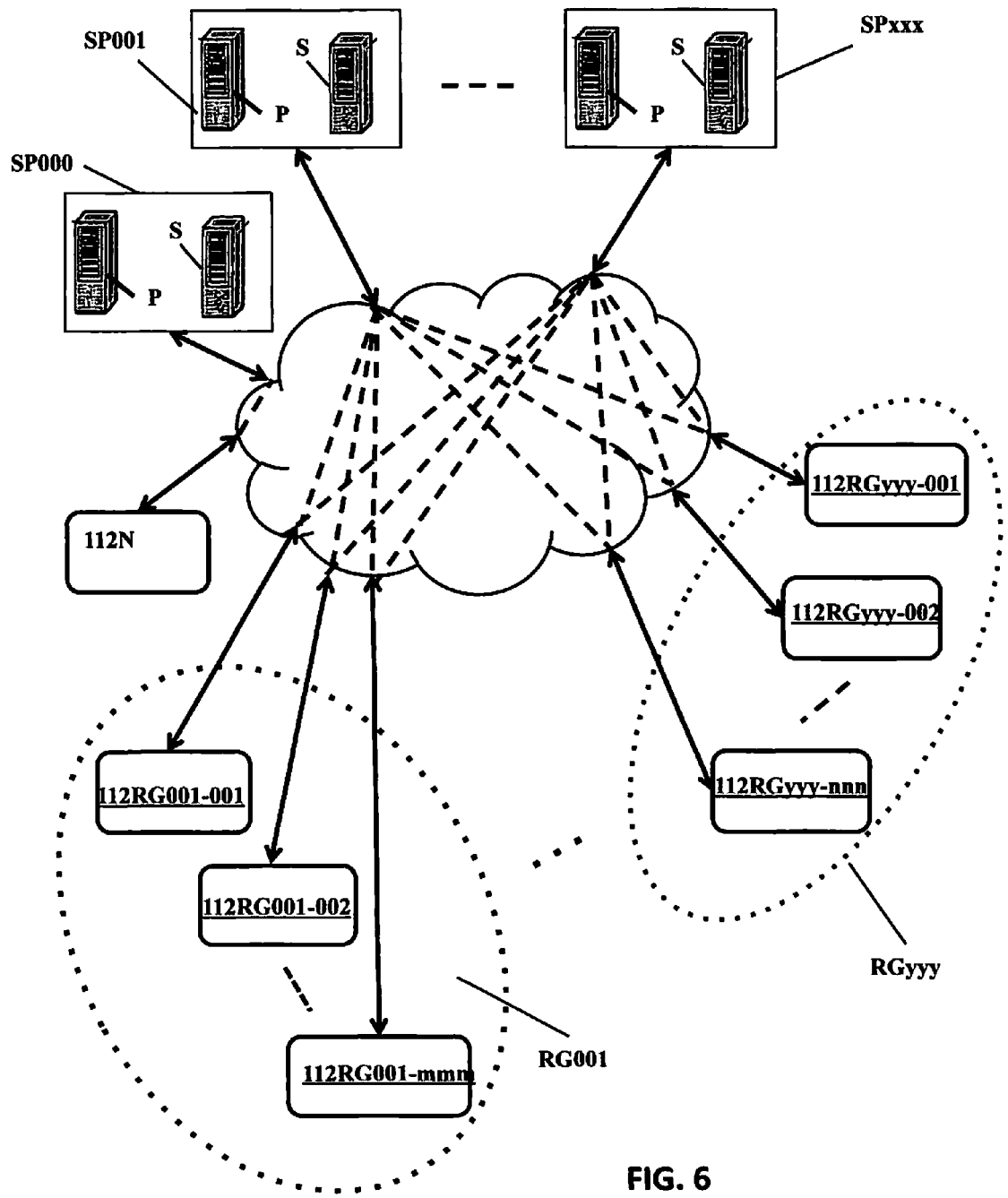
FIG. 6 illustrates details of an expandable router network.

Mobile router 112 comprises an interface 444 to a wireless communications link; a memory 442 storing information comprising configuration information 407; a memory 508 storing main server information utilizable to identify a main network server; and a communications agent 513 operable with the interface 444 to establish communication via the wireless communications link 122 to a network 600 shown in FIG. 6 comprising a main server SP000 and a plurality of group servers SP001 . . . SPxxx. Network 600 is an expanded version of network 100 shown in FIGS. 1, 2, and 3. Communications agent 513 is operable such that its initial communication to network 600 utilizes the main server information stored in memory 508 to establish a first communication with main server SP000. Mobile router 112 further comprises processor or microprocessor 440 operable with communications agent 513 to interact with main server SP000 to upload the configuration information from memory 407 to main server SP000 via network 600 shown in FIG. 6.

Communications agent 513 is operable to receive group server identification information from main server SP000 when communicating with main server SP000 a second time. Microprocessor 440 is operable to store the group server identification information in memory 508. The group server information comprises information identifying one or more servers corresponding with a predetermined group assigned by main server SP000. Communications agent 513 utilizes the group server identification information for subsequent communication via network 600.

The group server identification information is received by communications agent 513 from main server SP000 the second time mobile router 112 establishes communication with main server SP000. Communications agent 513 utilizes the group server identification information to access one group server of the plurality of group servers SP001, . . . , SPxxx.

The group server identification information comprises identification information for a predetermined number of group servers selectively assigned from the plurality of group servers SP001, . . . , SPxxx.

Turning back to FIG. 5, microprocessor 440 is operable to select a group server from the predetermined number of group servers with which to communicate via network 600. Microprocessor 440 selects the group server from the predetermined number of group servers in accordance with a predetermined selection algorithm. In one embodiment, the group server is selected by accessing the first available group server by attempting to access the group servers in sequential order as stored in memory 508.

Although the above description refers to each server in the singular, in an embodiment of the invention, each group server SP001, . . . , SPXXX shown in FIG. 6 comprises a corresponding pair of servers P, S that are identically configured.

One group server P, S of each group server pair operates as a primary server P to track and monitor the plurality of mobile routers and the corresponding paired server is selected as a backup secondary server S. Each primary group server P and its corresponding secondary server S operate such that data in primary group server P is replicated into its corresponding secondary server S.

Primary group server P and the secondary server S operate to determine if a failure occurs in the primary group server; and the primary group server P and the secondary server S operate to automatically switch to the secondary server as primary group server upon occurrence of a failure. After the original primary group server P is repaired, it is manually switched back in service.

The group server pairs SP001, . . . , SPxxx are dispersed to be located at dispersed geographic locations and have different network peering points.

When a new mobile router 112N is provisioned at the factory, it is configured to talk to the "main" communications server pair SP000 at the network operations center 141 shown in FIG. 1 by storing access information for "main" communications server pair SP000 in memory 508. Each newly provisioned mobile router 112N registers with the "main" communications server pair SP000 and uploads its configuration information to "main" communications server pair SP000. When mobile router 112N registers with the "main" communications server pair SP000 it calls into an "unassigned" server group address by default.

When mobile router 112N is sold and shipped it is assigned to a group selected from a plurality of groups RG001-RGyyy. The group to which a mobile router 112 is assigned is usually customer specific. Non-limiting examples of such customers to which a mobile router is assigned include automotive companies, e.g., Chrysler, or electronics retailers, e.g., Best Buy.

The next time mobile router 112N comes on line and talks to main communications server pair SP000, main communications server pair SP000 will identify that mobile router 112N has been assigned to a group selected from the groups RG001 through RGyyy that is different from the "unassigned" group. Main communications server pair SP000 will then reassign mobile router 112N to talk to a new communications server pair that handles the group to which mobile router 112N has been assigned by downloading the new communication server pair access information to memory 508. The new communications server pair is selected from the communications server pairs SP001 through SPxxx There can be multiple communications server pairs per group and each communications server can support multiple groups.

Each mobile router 112 is configured by the main communications server pair SP000 with addresses for multiple communications server pairs. The addresses for the multiple communication server pairs are stored in mobile router 112 memory 508 shown in FIG. 5. Memory 508 may be an assigned portion of memory 442 as shown or may be a separate memory. Each mobile router 112 will access the server addresses stored in its corresponding memory 508 in a predetermined order. If a communication server pair associated with a first address is unavailable, mobile router 112 will access the next address of a communications server stored in memory 508. Mobile router 112 will access communications server addresses from memory 508 in predetermined order until communications with a corresponding communications server is established.

Figure 7:
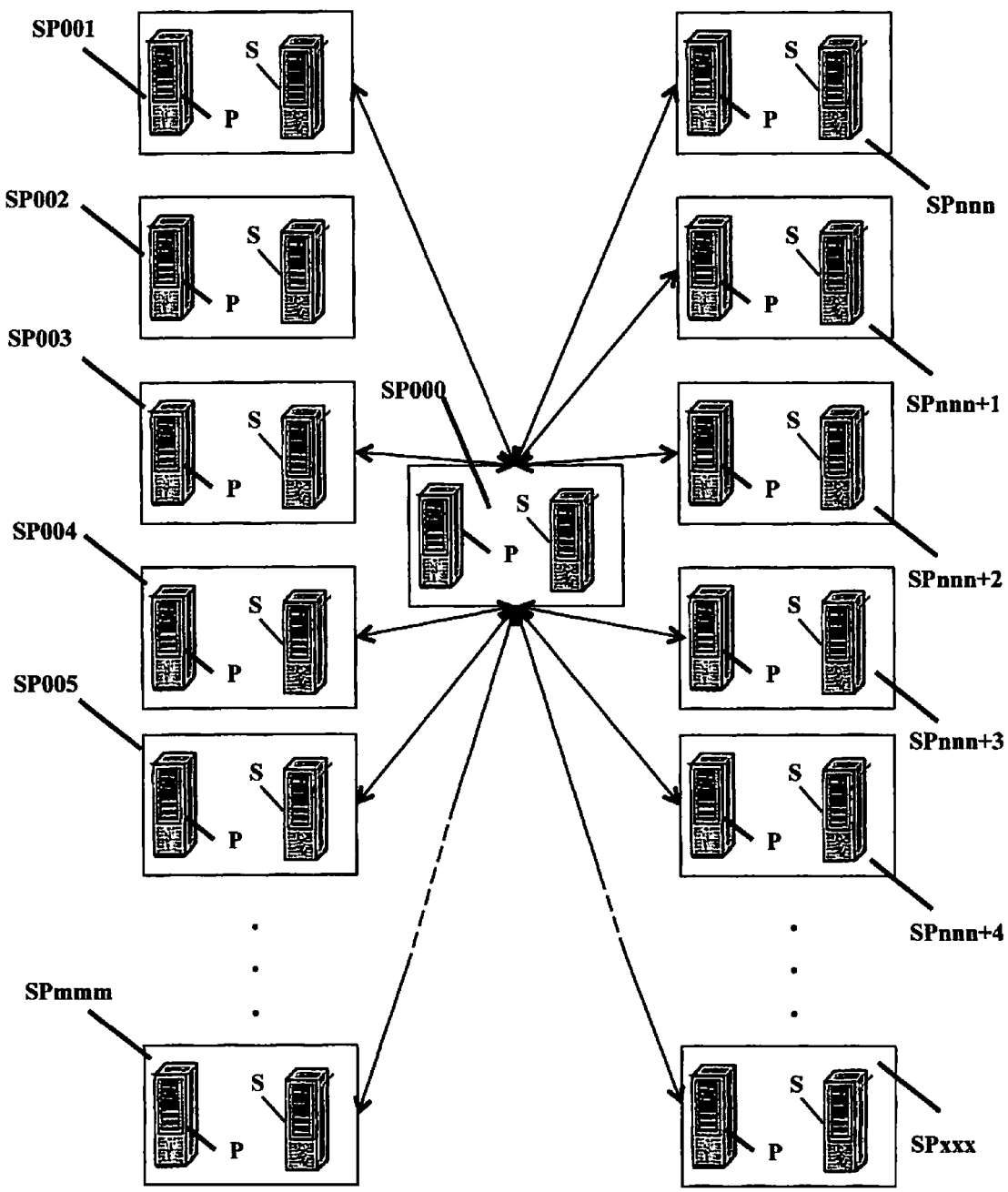
FIG. 7 illustrates further details of the network of FIG. 6.

Main server pair SP000 includes a manager program. The manager program is provided so that main server pair SP000 may communicate to all of communications servers SP001-SPXXX, so an operator of the network system never needs to know which communications server communicates with which router. The communication by main server pair SP000 to server pairs SP001-SPXXX is illustrated in FIG. 7.

Communications server pairs SP001-SPXXX do not need to be located in the same facility. It is preferable that the communications server pairs SP001-SPXXX are not in the same facility. It is highly preferable that the communications server pairs SP001-SPxxx are geographically disperse and have different network peering points.

With the server network architecture described above, added capacity is easily added by simply adding additional server pairs and configuring them as available within the system manager at the network operations center SP000.

In the various embodiments, a networked mobile router system comprises: a plurality of mobile routers 112N, 112RG001-001, . . . , 112RGyyy-nnn; a main server SP000; and a plurality of group servers SP001, . . . , SPxxx. Each mobile router 112N, 112RG001-001, . . . , 112RGyyy-nnn is initially configured to communicate with the main server SP000. A first linked communication between each mobile router 112N and main server SP000 is provided. Each mobile router 112N, 112RG001-001, . . . , 112RGyyy-nnn is operable to initially register with main server SP000 and operable to upload configuration information from each mobile router 112N, 112RG001-001, . . . , 112RGyyy-nnn to main server SP000. Main server SP000 is operable to assign each mobile router 112N, 112RG001-001, . . . , 112RGyyy-nnn with at least one predetermined group selected from a plurality of predetermined groups RG001, . . . , RGyyy. Main server SP000 is operable, subsequent to registering and assigning mobile router 112N to reassign each mobile router 112N to communicate with at least one group server assigned to communicate with the predetermined group RG001, . . . , RGyyy by providing each mobile router 112N, with the address of at least one corresponding group server. In the embodiment shown, mobile router 112N is a router that has not been assigned to a group yet and mobile routers 112RG001-001, . . . , 112RGyyy-nnn are assigned to their corresponding groups.

Main server SP000 is operable to reassign each mobile router 112N, 112RG001-001, . . . , 112RGyyy-nnn with a predetermined number of group server addresses; and each mobile router 112N, 112RG001-001, . . . , 112RGyyy-nnn is operable to communicate with a corresponding predetermined number of group servers SP001, . . . , SPyyy selected from the plurality of group servers. Each group server address corresponds to one of the predetermined number of group servers SP001, SPyyy.

Each mobile router 112N, 112RG001-001, . . . , 112RGyyy-nnn is operated to communicate with one of the predetermined number of group servers SP001, . . . , SPyyy corresponding to one of the predetermined number of addresses.

In the methodology of an embodiment, a method comprises the steps of providing a plurality of mobile routers 112N, 112RG001-001, . . . , 112RGyyy-nnn; providing a main server SP000 for tracking and monitoring the plurality of mobile routers 112N, 112RG001-001, . . . , 112RGyyy-nnn; initially configuring each mobile router 112N, RG001-001, . . . , 112RGyyy-nnn to communicate with the main server SP000; providing a first linked communication between each mobile router 112N, 112RG001-001, . . . , 112RGyyy-nnn and main server SP000; registering each mobile router 112N, 112RG001-001, . . . , 112RGyyy-nnn with main server SP000 and uploading configuration information from each mobile router 112N, 112RG001-001, . . . , 112RGyyy-nnn to main server SP000; assigning each mobile router 112N, 112RG001-001, . . . , 112RGyyy-nnn with a predetermined group SP001, . . . , SPyyy; subsequent to the registering and assigning steps, providing a second linked communication between each mobile router 112N, 112RG001-001, . . . , 112RGyyy-nnn and main server SP000; and operating main server SP000 such that when the second linked communication occurs, main server SP000 reassigns each mobile router 112N, 112RG001-001, . . . , 112RGyyy-nnn to communicate with at least one group server SP001, . . . , SPyyy assigned to communicate with the predetermined group.

The embodiment may further comprise providing at least one group server SP001, . . . , SPyyy with a corresponding paired group server P, S. Each server P and its corresponding paired server S are identically configured. The embodiment further comprises: selecting at least one group server P as a primary server to track and monitor the plurality of mobile routers; selecting the corresponding paired server as a secondary server; and replicating data in the primary group server into the secondary. The replicating data step may be performed in real time.

The embodiment may even further comprise determining if a failure occurs in the primary server P; and automatically switching to the secondary server S as primary server upon determination of occurrence of the failure.

Still further, the embodiment may include repairing the primary server having the failure; and utilizing manual switchover to place the repaired server back in service.

It will be appreciated by those skilled in the art that various changes and modifications may be made to the embodiments described herein without departing from the spirit or scope of the invention. It is intended that the invention not be limited in any way by the embodiments shown and described herein, but that the invention be limited only by the claims appended hereto.

What is claimed is:

1. A method of operating a mobile router, comprising: an interface to a wireless communications link; a memory; a communications agent operable with said interface to establish communication via said wireless communications link to a network comprising a main server and a plurality of group servers; and a microprocessor operable with said communications agent to interact with said main server, said method comprising:

storing information comprising configuration information and main server information utilizable to identify a main network server in said memory;

operating said communications agent such that its initial communication to said network utilizes said main server information to establish a first communication with said main server;

uploading said configuration information from said memory to said main server via said network during said first communication;

operating said communications agent such that its second communication to said network utilizes said main server information to establish a second communication with said main server;

operating said communications agent to receive group server identification information from said main server during said second communication;

operating said microprocessor to store said group server identification information in said memory, said group server information comprising information identifying one or more servers corresponding to a predetermined group server to which said mobile router is assigned by said main server; and utilizing said group server identification information for communication subsequent to said second communication via said network to communicate via said one or more servers.

2. A method in accordance with claim 1, comprising;
operating said communications agent to utilize said group server identification information to access one group server of said plurality of group servers.

3. A method in accordance with claim 1, comprising:
receiving said group server identification information comprising identification information for a predetermined number of group servers selectively assigned from said plurality of group servers.

4. A method in accordance with claim 3, comprising:
operating said microprocessor to select a group server from said predetermined number of group servers with which to communicate via said network.

5. A method in accordance with claim 4, comprising:
operating said microprocessor to select said group server from said predetermined number of group servers in accordance with a predetermined selection algorithm.

6. A method of operating a mobile router, comprising an interface to a wireless communications link, a memory, and apparatus operable to establish communication via said wireless communications link to a network comprising a main server and a plurality of group servers, said method comprising:

storing information in said memory comprising configuration information and main server information utilizable to identify said main server;

operating said apparatus such that its initial communication to said network utilizes said main server information to establish a first communication with said main server;

utilizing said apparatus to upload said configuration information to said main server via said network during said first communication;

receiving group server identification information from said main server;

storing said group server identification information in said memory, said group server information comprising information identifying one or more servers corresponding to a predetermined group of servers assigned by said main server; and utilizing said group server identification information for subsequent communication over said network via said one or more servers corresponding to a predetermined group of servers.

7. A method in accordance with claim 6, comprising:
receiving said group server identification information from said main server the second time said mobile router establishes communication with said main server.

8. A method in accordance with claim 7, comprising:
utilizing said group server identification information to access one group server of said plurality of group servers for communications.

9. A method in accordance with claim 7, wherein:
selecting said group server identification information to comprise identification information for a predetermined number of group servers selectively assigned from said plurality of group servers.

10. A method in accordance with claim 9, comprising:
selecting a group server from said predetermined number of group servers to communicate with via said network.

11. A method in accordance with claim 10, comprising:
selecting said group server from said predetermined number of group servers in accordance with a predetermined selection algorithm.

12. A method for operating a mobile router, comprising an interface to a wireless communications link, a memory, and apparatus to control operation of said mobile router, said apparatus operating in cooperation with said memory and said interface, said method comprising:
storing information in said memory, said information comprising configuration information and main server information utilizable to identify a main network server;
establishing initial communication via said wireless communications link to a network comprising a main server and a plurality of group servers;
directing said initial communication to said main server to establish a first communication with said main server;
uploading said configuration information to said main server via said network;
establishing a second communication to said main server;
receiving group server identification information from said main server during said second communication;
storing said group server identification information, said group server information comprising information identifying one or more servers corresponding to a predetermined group of servers assigned by said main server; and
utilizing said group server identification information for subsequent communication via said network.

13. A method in accordance with claim 12, wherein:
receiving said group server identification the second time said mobile router establishes communication with said main server.

14. A method in accordance with claim 13, comprising:
utilizing said group server identification information to access one group server of said plurality of group servers for communications.

15. A method in accordance with claim 13, wherein:
selecting said group server identification information comprises identification information for a predetermined number of group servers selectively assigned from said plurality of group servers.

16. A method in accordance with claim 15, comprising:
selecting a group server from said predetermined number of group servers to communicate with via said network.

17. A method in accordance with claim 16, comprising:
selecting said group server from said predetermined number of group servers in accordance with a predetermined selection algorithm.

\* \* \* \* \*